Oct. 21, 1958     C. P. GEEN     2,856,749
SPINDLE ASSEMBLY
Original Filed Sept. 11, 1950     5 Sheets-Sheet 2
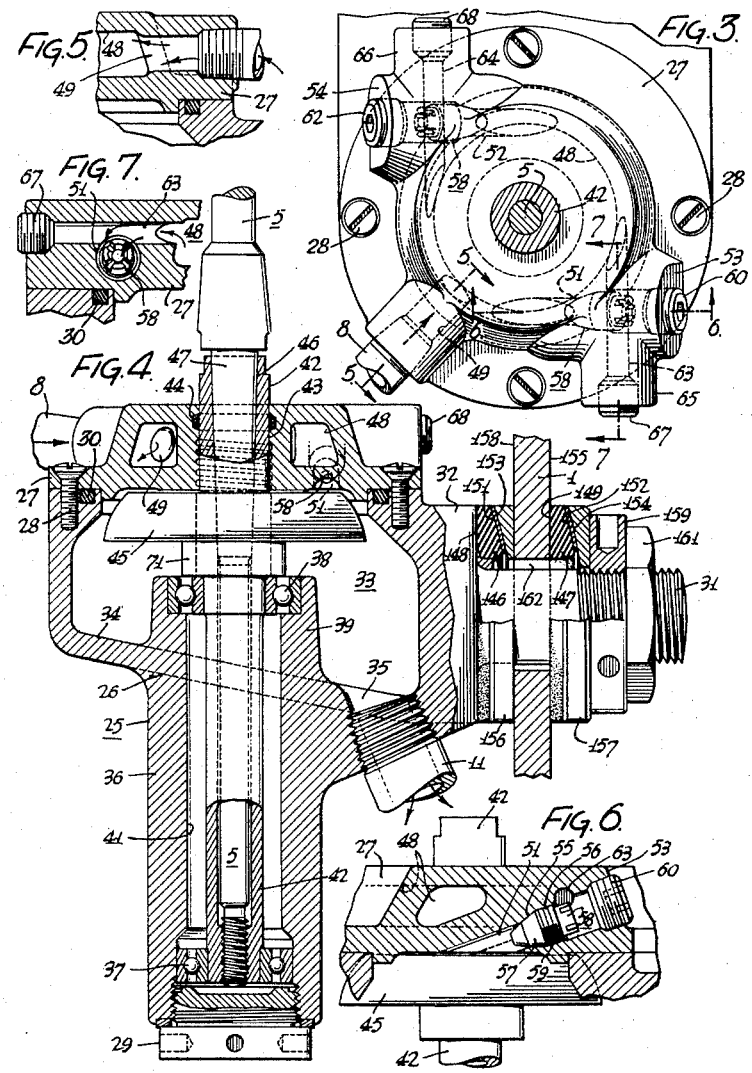
INVENTOR
CORY P. GEEN
BY
Oberlin & Limbach
ATTORNEYS.

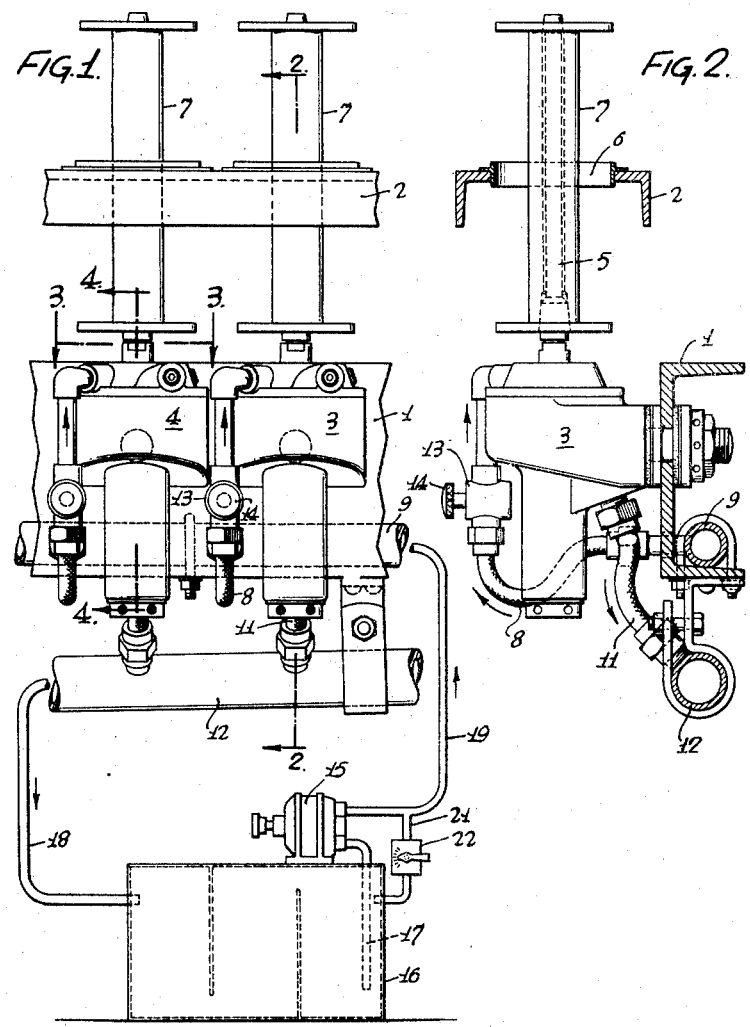

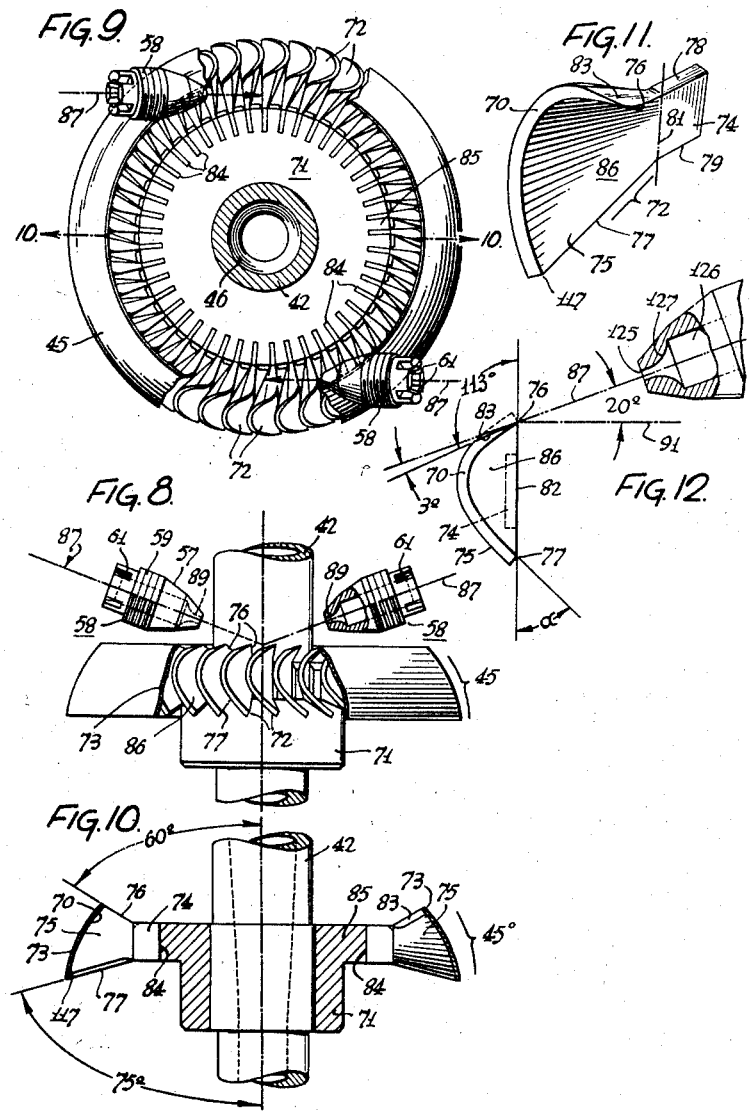

Oct. 21, 1958   C. P. GEEN   2,856,749
SPINDLE ASSEMBLY
Original Filed Sept. 11, 1950   5 Sheets-Sheet 4
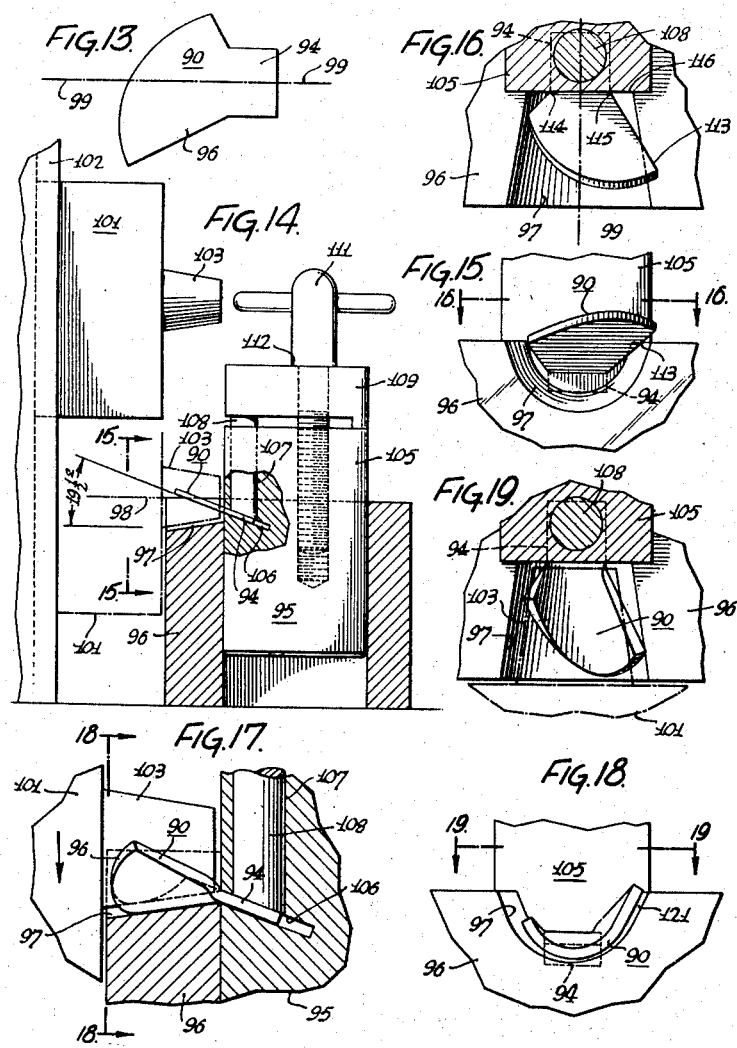
INVENTOR
CORY P. GEEN
BY
Oberlin & Limbach
ATTORNEYS.

Oct. 21, 1958
C. P. GEEN
2,856,749
SPINDLE ASSEMBLY
Original Filed Sept. 11, 1950
5 Sheets—Sheet 5
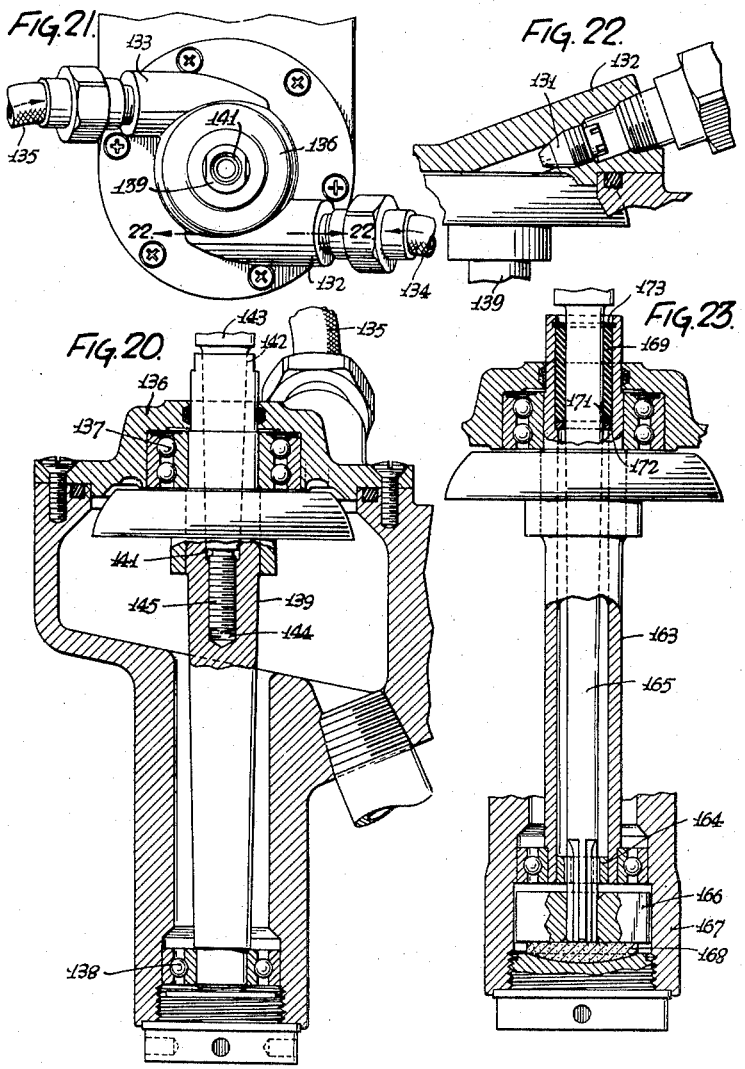
INVENTOR
CORY P. GEEN
BY
Oberlin & Limback
ATTORNEYS.

United States Patent Office 2,856,749
Patented Oct. 21, 1958

2,856,749
SPINDLE ASSEMBLY

Cory P. Geen, Philadelphia, Pa., assignor to Industrial Devices Inc., Philadelphia, Pa., a corporation of Pennsylvania Original application September 11, 1950, Serial No. 184,284, now Patent No. 2,663,541, dated December 22, 1953. Divided and this application December 18, 1953, Serial No. 399,002

1 Claim. (Cl. 57—101)

This invention relates as indicated to hydraulic motors and particularly to liquid powered, single-stage impulse reaction turbines which are particularly suited for use as fractional horsepower drives.

It is a principal object of the invention to provide a hydraulic motor of the character described of novel design and functional characteristics adapted specifically to a wide variety of uses such as multi-spindle textile machinery.

Still more specificaly, an object of the invention is to provide a fractional horsepower hydraulic motor in the form of an extremely compact unit, capable of normal operation in excess of 10,000 R. P. M. at reasonable pressures, flexible as to speed adjustment and exhibiting a high degree of uniformity in both speed and torque at any adjusted speed, and ecenomical of manufacture and operation.

Other objects of the invention will appear as the description proceeds.

The invention resides further in certain structural and mechanical details hereinafter described and illustrated in the attached drawings, wherein:

Fig. 1 is a semi-diagrammatic elevational view showing a fragmentary part of a multi-spindle textile spindle frame made in accordance with the invention;

Fig. 2 is a sectional view on the line 2—2, Fig. 1;

Fig. 3 is a sectional view on the line 3—3, Fig. 1;

Fig. 4 is a vertical sectional view on the line 4—4, Fig. 1;

Figs. 5, 6 and 7 are sectional views on the lines 5—5, 6—6, and 7—7, respectively, of Fig. 3;

Fig. 8 is an enlarged side elevational view partly in section of the rotor of the motor unit shown in immediately preceding figures;

Fig. 9 is a plan view of the rotor shown in Fig. 8;

Fig. 10 is a sectional view on the line 10—10, Fig. 9;

Fig. 11 is an enlarged view in perspective of one of the rotor vanes;

Fig. 12 is a fragmentary enlargement of Fig. 8 showing vane and nozzle details;

Fig. 13 is a plan view of one of the vane blanks;

Fig. 14 is an elevational view partly in section of a vane forming die showing one of the vane blanks in position preparatory to forming operation;

Fig. 15 is a fragmentary enlargement as viewed from the line 15—15, Fig. 14;

Fig. 16 is a sectional view on the line 16—16, Fig. 15;

Fig. 17 is a fragmentary enlargement of Fig. 14 showing the vane shaping element in the fully advanced working position;

Fig. 18 is an elevational view as seen from the lines 18—18, Fig. 17 after retraction of the male die element;

Fig. 19 is a sectional view on the line 19—19, Fig. 18;

Fig. 20 is a fragmentary vertical sectional view of a hydraulic spindle unit of modified form but still within the scope of the invention;

Fig. 21 is a top plan view of the unit shown in Fig. 20;

Fig. 22 is a sectional view on the line 22—22, Fig. 21, and

Fig. 23 is a fragmentary vertical sectional view of a spindle unit illustrating still another modification.

With reference to Figs. 1 and 2 of the drawings, 1 is a side rail of a multi-spindle spinning frame, and 2 is the vertically reciprocated ring rail. Attached to the rail 1 in longitudinal series are a plurality of hydraulic motor units of which two adjoining units are shown at 3 and 4. Each of these units carries a spindle 5, shown in broken lines, which extends upwardly through an opening 6 in the rail 2 and which in the present instance supports a spool 7. The unit 3 is connected to a source of pressure fluid by way of a flexible duct 8 and a manifold 9; and the unit is also connected through a flexible duct 11 to a discharge manifold 12. As shown in Fig. 2, the duct 8 contains a normaly open shut-off valve 13 which may be closed by pressure of the finger or other part of the body against the button 14 for temporarily stopping an individual unit. The source of pressure fluid consists in the present instance, see Fig. 1, of a pump 15 which is connected to the prime mover of the frame or is otherwise synchronized with the builder motion, feed rolls, and other mechanical elements of the frame. The source of pressure fluid also comprises a make-up tank 16 to which the pump is connected by a pipe 17. The discharge manifold 12 is connected to the tank 16, as indicated at 18 in Fig. 1; and the manifold 9 is connected to the discharge of pump 15 as indicated at 19. The direction of fluid movement in the fluid system resulting from operation of pump 3 is indicated by the arrows. The unit 4 and all other motor units of the series are similarly connected to the manifolds 9 and 12. A bypass 21 extends from the pipe 19 to the tank 16 and this bypass contains an adjustable pressure regulating valve 22. Pressure in the manifold 9 may be regulated by valve 22; and further regulation of the flow of the energizing fluid to a group of motors may be effected by a conventional flow-control valve (not shown) located after the valve 22 in the pipe 19.

The general form of the individual motor unit and its mounting is well illustrated in Figs. 3 to 7 of the drawings. The unit comprises a casing 25 which includes a hollow body member 26, a cover member 27 secured to the said body member by screws 28, and a plug 29 threaded into and closing the lower end of the body member. The body member is provided with a stud 31 which extends laterally from a boss 32 on the side of the body member and affords a means for mounting the motor unit on the rail 1, as hereinafter more fully described.

As shown in Fig. 4, the casing 25 contains a chamber 33 formed in the upper part of the body member 26. The cover 27 forms the top wall of the chamber 33, and the bottom wall 34 slopes downwardly from one side to the other of the chamber and terminates at its lower end in a port 35. In the assembly illustrated in Figs. 1 and 2 and described above, this port, which constitutes a discharge port for the chamber 33, is connected through the duct 11 with the manifold 12.

The body member 26 terminates at the bottom in a tubular extension 36 which is closed at its lower end by the screw plug 29 mentioned above. An anti-friction bearing 37 is mounted in the lower end of the extension, and a similar bearing 38 is mounted in a hollow boss 39, which extends upwardly into the chamber 33 from the bottom wall 34 in alignment with the extension 36 and which in effect forms a continuation of the bore 41 of said extension in the chamber.

The bearings 37 and 38 support a hollow rotor shaft 42 which extends through the chamber 33 and through an opening 43 in the cover member, said opening being sealed by suitable packing 44. Attached to the shaft 42 and occupying a position in the upper part of the chamber 33 is a rotor 45 which will be described in detail below. The rotor shaft is threaded at its lower end for reception of the lower threaded end of the spindle 5, which is supported in the rotor shaft, and the upper end of the shaft, which projects slightly beyond the upper surface of the cover member, is provided with a taper seat 46 (preferably a standard Morse taper) for reception of a tapered section 47 on the spindle 5, this tapered interseat functioning in conjunction with the threaded connection at the lower end of the rotor shaft to anchor the spindle securely in the shaft. By this means spindle blades of various forms may be interchanged to meet required mill changes in type of bobbin without disturbing any other part of the motor unit assembly.

The cover member 27 has an inner annular chamber 48 which extends completely around the shaft opening 43. Admission to this chamber is afforded by a tapped port 49 which is formed in the side of the cover member as best illustrated in Fig. 5. In the assembly illustrated in Figs. 1 and 2 and previously described, the port 49 is connected through the duct 8 with the manifold 9.

At diametrically opposite sides respectively of the cover member and equidistant from the port 49, the said member is provided with a pair of ports 51 and 52 which extend through bosses 53 and 54 on the side wall of the member diagonally downwardly and inwardly to intersect the bottom wall of the cover member at points immediately above and at diametrically opposite sides of the rotor 45. Each of the ports 51 and 52 has intermediate its ends a conical shoulder 55 and an adjoining threaded portion 56 which function respectively as a seat for the inner tapered end portion 57 of a nozzle element 58 and to secure the said element, which is externally threaded at 59, in the port. As best shown in Figs. 8 and 9, the nozzle element 58 is provided at its outer end with slots 61 for reception of a suitable tool by which the said element may be turned into place in or retracted from the port. The outer ends of the ports 51 and 52 are threaded for reception of screw plugs 60 and 62 respectively which seal said outer ends. Communication between the ports 51 and 52 and the chamber 48 is established at points intermediate the nozzle element 58 and the plugs 60 and 62 by way of channels 63 and 64 respectively which are drilled or otherwise formed in the wall of the cover member, said channels, in the present instance, entering through bosses 65 and 66 on the side of the cover member at right angles to and in intersecting relation to the respective ports 51 and 52 and terminating in the chamber 48 as shown in Figs. 3 and 7. In the present instance, the outer ends of the channels 63 and 64 are closed by screw plugs 67 and 68.

The rotor 45, as best shown in Figs. 9 to 12, consists essentially of a base ring or hub 71, which is securely fixed on the shaft 42; an annular series of vanes, designated individually by reference numeral 72, which are carried by and extend outward radially from the cylindrical peripheral surface of the hub 71; and a shroud 73 which closely embraces and conforms in contour to the outer end edges 70 of the vanes and which is suitably secured to the latter.

The vanes, which are identical, are formed, as shown in Fig. 11, with a rectangular root portion 74 and a concave-convex working portion 75, the upper and lower edges 76 and 77 of which, with reference to the position which the vane assumes in the rotor assembly, diverge outward with respect to each other from the respective corresponding edges of the root portion 74 so that the said working portion 75 is of considerably greater depth at its outer end than at its inner or root adjoining end. In the present instance, the upper edge 76 of the portion 75 forms an angle of 30° with the upper edge 78 of the root portion 74, see Fig. 10, while the lower edge 77 of the working portion extends at an angle of 15° to the lower edge 79 of the root portion, the said upper and lower edges being normal to the axis of the rotor. Thus the included angle between the edges 76 and 77 is in the present instance 45°. The lower edge 77 is longer than the upper edge 76, so that the end edge 70 of the vane, curving outwardly and downwardly, extends generally at a substantial angle to a line 81, Fig. 11, intersecting the inner ends of the said edges.

As shown in Fig. 12, the edges 76 and 77 lie in a common plane corresponding to the plane of the face 82 of the root portion 74; and the working portion 75 is beveled at the top so that edge 76 is defined by a line. In the present instance, the face 83 of said bevel declines rearwardly from the edge 76 at an angle to the said common plane of the edges 76 and 77 of 113°, as indicated in Fig. 12.

In the rotor assembly, the rectangular root portions 74 of the vanes occupy radial slots 84 in a radial flange 85 at the upper end of the hub 71, the said root portions neatly fitting the slots and being anchored to the hub by brazing, welding or other suitable means. The working portions 75 of the vanes assume the relatively spaced positions shown in Figs. 8 and 9 with the edges 76 extending in radial planes; and with the inner ends of the edges 76 of all the vanes lying in a common plane normal to the axis of the spindle 5, and the outer ends of the said edges 76 occupying a second common plane also normal to the said axis but spaced from the plane of the inner ends. The concave faces 86 of the vanes, by reason of the aforesaid discrepancy in the lengths of the edges 76 and 77, increase progressively in the radial dimension from top to bottom; and by reason of the fact that the edges 76 and 77 lie in a common radial plane, which also includes the inner ends of the faces, the faces 86 also increase progressively in effective depth from the inner ends to the outer. This latter characteristic is well illustrated in Fig. 11.

The nozzle ports 51 and 52, as shown in Fig. 3, are formed in planes parallel to the axis of the shaft 5 and tangential to the rotor, and the ports are located with respect to the rotor so that the center lines 87, see Fig. 8, of the orifices 89 of the nozzles 58 will intersect the edges 76 of the blades at the approximate mid points of said edges and in the present instance at an angle of 20° to the true tangent intersecting the said edges at the same point, as shown in Fig. 12 wherein the said true tangent line is indicated at 91. The center line 87 is then at an angle of 3° to the bevel face 83 at the top of the vane, which face, as previously described, lies at an angle of 113° to the common plane of the edges 76 and 77, whereas the center line 87 lies at an angle of 70° to the same plane. It will be noted with reference to Figs. 8 and 9 that the intersections of the center lines 87 of the two nozzles 58 with the edges 76 of the vanes will occur respectively at diametrically opposite points on the rotor. If the vanes are even in number, the intersection occurs simultaneously in any given position of the rotor; but if the number of the vanes is uneven the intersection will not occur simultaneously.

The precise form of the vanes may be best understood by a study of a fixture capable of producing a finished vane in a single operation from a suitably shaped flat blank. The blank 90 is shown in Fig. 13, and the fixture of Fig. 14. The extension 94 of the blank, which forms the flat root portion 74 of the vane, is secured in a clamp 95 so that the remaining portion 96 of the blank projects upwardly at an angle of 19½° to the horizontal above an anvil 96, the upper face of the anvil being recessed and the said recess 97 defining the surface of a 40° included angle cone whose major axis lies on a horizontal line 98 and whose apex lies to the right as viewed in Fig. 14. The bottom of the recess 97 will lie at an angle of 20° to the horizontal, and as shown in Fig. 16, the blank will occupy a position wherein the center line 99 which bisects the extension 94 will lie in the vertical plane which contains the axis 98 of the conical recess 97. A hammer 101 guided for reciprocation in a vertical guide 102 in the press, carries a conical male die element 103 which is arranged for cooperation with the recess 97, as the female die element, in the forming operation, the said element 103 being in vertical alignment with the said recess as shown in Fig. 14. The male die element is in the form of a truncated 40° cone, but is smaller in diameter than the conical recess 97 to an extent corresponding to the thickness of the blank 90 which in the present instance is approximately .033 of an inch. When the male element 103 is brought into forcible engagement with the blank supported in the clamp 95 as described above so as to press the blank into the recess 97 as shown in Figs. 17 and 19, the portion 96 of the blank will be made to assume the form described above, the inner and outer surfaces constituting segmental parts of the conical surfaces represented respectively by the male and female die elements.

Referring now more specifically to the drawings, the clamp 95 consists of a block 105 which is slidably mounted for vertical movement in the body of the anvil 96. The block 105 has in the face thereof which confronts the die recess 97, a slot 106 which receives the extension 94 of the vane blank and which extends inwardly and downwardly from the said face at an angle of 19½°. The upper wall of the slot is intersected by a cylindrical bore 107 which extends vertically from the top of the block. A clamping pin 108 fits slidably in the bore, and in the present instance is carried by a clamping bar 109 which is secured at the top of block 105 by a screw 111, said screw being threaded into the block, as shown in Fig. 14, and having a shoulder 112 which engages the top of the bar 109 and affords a means for forcibly pressing the pin 108 down upon a blank occupying the slot 106 as described.

The initial position of the portion 96 of the blank with respect to the conical die recess 97 of the anvil is shown in Figs. 14, 15 and 16. The blank is wider at one side than the recess so that the point 113 of the blank contacts the top of the anvil at one side of the die recess and supports the blank, and the clamp, in the positions shown. As shown in Fig. 16, the inner ends of the diverging side edges of the portion 96 of the blank, indicated in Fig. 16 by the reference numerals 114 and 115 lie at the slotted face 116 of the clamp so that only the said portion 96 of the blank is exposed to the action of the die.

When the male element 103 of the die is pressed down upon the blank, the mid portion 96 of the blank is displaced downwardly from the plane of the blank and angularly with respect to the extension 94. This angular displacement is greatest in the vertical plane which contains the center line of the male element 103 and decreases progressively to the side edges of the formed vane which are drawn inwardly toward each other from their original positions in the blank but which remain in the original plane of the latter. The final form of the vane when the die elements are in the ultimate positions is shown in Figs. 17, 18 and 19.

With the reference now to the operation of a motor and to the function of the vanes constituted as described above, a motivating fluid, preferably of the nature of a high grade light mineral oil, is pumped by pump 15 from the tank 16 to manifold 9 under a suitable pressure preferably not exceeding 1500 p. s. i. The fluid passes from the manifold to the chambers 48 of the individual spindle units 3, 4, etc. which are connected to the manifold, and is projected through the nozzles 58 in the form of high velocity jets against the vanes of the rotor. The fluid after delivering a major part of its energy to the rotor passes from the rotor chamber 33 to the manifold 12 and completes the cycle by return to the tank 16. Discharge from the rotor chamber may be by gravity alone or may be assisted by a suitable scavenging pump (not shown).

As previously noted, the nozzles 58 are located above and in close proximity to the rotor and direct the streams downward at a relatively flat angle, the streams being intersected by the sharp edges of the vanes as they move in the circular path and thereby entering the reaction areas of the vanes.

The operative relation between the nozzles and rotor are fixed by the facts that the shaft 42, and therefore the rotor, are mounted in fixed position in the casing, and that the cover 27, in which the nozzles are fixed, is supported solidly on the wall of the casing, as shown in Fig. 4. The joint between cover and casing is sealed by a confined O-ring 30 which does not interfere with the metal to metal contact. The bevels 83 of the blades which terminate in the edges 76 are always formed at an angle to the horizontal slightly greater, preferably by about 3°, than the angle of the nozzle, see Fig. 12, so that the jet is intersected by the sharp edge 76 and never by the heel of the blade. The said cut-off is thereby clean and free from jet dispersion tendency.

A preferred form of nozzle is illustrated in Fig. 12. As shown, the discharge orifice 125 is cylindrical in form and the length of the orifice should not be less than the diameter nor exceed two times the diameter. The nozzle channel 126 which terminates in the orifice should be materially greater in diameter than the orifice and preferably is at least several times greater. The juncture of the inner end of the orifice with the channel should exhibit a curve of large radius, as indicated at 127, not less preferably than four times the orifice diameter, which merges smoothly into the straight sides of the orifice at the inner end of the latter. A nozzle of this construction will be substantially free from turbulence at any pressure and will discharge a solid cylindrical stream which will maintain its form over materially greater distances than those involved in the present application. In general, the nozzles of lesser diameter will exhibit higher speed and lower torque producing properties than those of greater diameter.

The shape and contour of the working face 86 of the vane in conjunction with the angular entry of the fluid at the top of the rotor has an important effect on the functional characteristics of the motor. The upper edge portion of the working face in the vertical plane containing the jet lies at a small angle to the stream, as indicated in Fig. 12, so that entry of the fluid to the vane in the undispersed jet is shockless; and from the point of impact the fluid, traveling over a long arc on the face of the vane toward the discharge tip 117, is expanded outwardly radially and downward vertically, this by reason of the progressively increasing area of the said face both horizontally from the inner edge and vertically from the upper edge. The smooth curve of the face terminating in the reversely directed lower edge portion supports the undisturbed flow of the fluid and extracts maximum energy from the fluid stream since the motor functions essentially on the reaction principle. The foregoing characteristics together with the multiplicity of vanes and plural nozzles render the operation of the rotor practically pulseless, and this factor is aided by use of an odd number of vanes which with two nozzles oppositely arranged gives assurance that when a vane is just entering the fluid stream at one side of the rotor the opposite vane is receding past maximum power position. Obviously, an even number of vanes and staggered nozzles would achieve the same result, but with more complication in manufacture.

The angle of the top edge 76 of the vane to the horizontal has an important effect on the speed and torque characteristics of the motor. If speed is the primary requisite, the angle between the top edge and the rotor shaft axis should be relatively great, say 60° (see Fig. 10) to 70°; and when less speed and more torque is required the angle should be say 50° or less.

The leaving angle of the vane as viewed from the outer end of the vane, designated α in Fig. 12, is preferably from 30° to 50° to the vertical. It will be noted that the tail portion 117 of the vane does not conform to the curvature of the male die 103 by reason of the slight flare of the upper edge of the female die recess shown at 121 in Fig. 18.

The angle of the lower edge 77 of the vane to the axis of the rotor shaft may vary. For high speed in the range from 16,500 to 18,000, the angle may suitably be from 80° to 85°; for medium speeds—10,000 R. P. M. to 16,500 R. P. M.—with greater torques, an angle in the neighborhood of 75° will be suitable, see Fig. 10; and for low speeds under 7,500 R. P. M. an angle of 65° to 70° may be used, without altering the fact that the rotor normally operates free and clear of its own wash A motor of the aforedescribed design meets all the essential requirements of a unit drive for the individual spindles of textile machines of the type set forth. It complies with the extremely limited space requirements and the close grouping of the spindles in such machines. It is readily possible at reasonable pressures, say 500 to 1500 p. s. i., to produce velocities in excess of 15,000 R. P. M. in a unit capable of 4" spacing and carrying a 2¾" rotor capable of handling heavy twisting operations on coarse yarns as well as higher speeds on fine count yarns. At these speeds the rotor operates free and clear of its own wash.

It is characteristic of these motors to operate in groups from a common source of fluid energy at highly uniform speeds and torques which thus affords a highly uniform end product due to the positive control over slippage and resulting uniform yarn speed. Relatively high spindle speeds are afforded beyond the scope of conventional drives for machines of this class, and consequent relatively great output of uniform yarn. The motor has inherent balance, is vibrationless and substantially wear-free so that the maintenance is reduced to a minimum. The units are flooded with operating fluid (oil) and are therefore self-lubricating. No hand oiling is required, materially reducing labor costs, and the frames stay clean and oil-free. Oil damage to the yarn is eliminated. Machines utilizing the drive are relatively simple and trouble-free, and can contain a greater number of spindles.

The embodiment of the invention shown in Figs. 20, 21, and 22, involves a material change in the cover member and in the arrangement of the nozzles in the cover. In this case the chamber 48 of the previously described cover member 27 has been eliminated, and the nozzles, of which one is shown at 131 in Fig. 22, are mounted in hollow bosses 132 and 133 in the cover and are connected to the source of fluid pressure by individual flexible ducts, 134 and 135 coupled into the outer ends of the said bosses.

In this case also the cover has a central elevated portion 136 which forms a housing for the upper rotor shaft bearing 137. This permits locating the bearing above the rotor, as illustrated, and relatively remote from the lowest shaft bearing 138 so as to afford greater stiffness for support of long heavy spindles. It will be noted also that in this case the bearing 137, if of sealed type, may function also as a seal between the shaft and the cover. The embodiment differs further from that previously described in the manner in which the spindle is mounted in the shaft. In this case the shaft 139 is not hollow throughout but is provided at the top with a tapered socket 141 which receives the lower tapered end 142 of the spindle 143. The socket extends somewhat beyond the inner end of the taper and is threaded as shown at 144 for engagement with the threaded terminal end 145 of the spindle. To insure that the tapered parts shall be self-seating, the threads may be formed with broad commercial tolerances as with national coarse or square threads. With this arrangement spindle length is greatly reduced with corresponding economy in material and production cost.

Fig. 4 of the drawings shows the casing 25 provided with a stud 31 for attaching the unit to the rail 1. In that instance, the stud is shown in association with certain other elements affording both adjustability and flexibility for the unit with respect to the supporting structure. In general, the attaching means consists of a pair of resilient rubber washers 146 and 147 each having a flat face 148 and 149, respectively, and a spherical opposite face, 151 and 152. To the latter faces are bonded spherically dished metal liner elements 153 and 154. As shown, the flat face of the washer 146, abuts the outer end face of the stud boss 32, and the corresponding face 149 of the washer 147 abuts the flat face 155 of the rail 1. The resilient, adjustable mount also comprises a pair of cupped washers 156 and 157, preferably of metal, which are interposed respectively between the washer 146 and the proximate face 158 of the rail 1, and between the washer 147 and a retaining nut 159 on the stud 31. A lock nut 161 secures the nut 159. In this mounting, the spherical interseating faces of the washers 146 and 156, and of the washers 147 and 157 afford a means for universal angular adjustment of the stud, and therefore of the unit as a whole, in the rail 1; and the fact that the stud 31 is of lesser diameter than the aperture 162 in the rail, through which the stud extends, affords opportunity for adjustments of the unit both horizontally and vertically. Resiliency in all directions and vibrations control is afforded by the washers 146 and 147. This resilient adjustable mount per se forms no part of the present invention and is the subject of a copending application for United States Patent, Serial No. 206,059, filed January 15, 1951, which has now issued as Patent No. 2,663,138, dated December 22, 1953.

In Fig. 23, I have disclosed a modification wherein resiliency and vibration control in the spindle mount is obtained by means built into the structure of the unit itself. In this case, the rotor shaft 163 is hollow throughout and is provided at its lower end with a splined plug 164 which receives the splined lower end of the spindle 165 and thereby establishes a driving connection between the shaft and the spindle. A cylindrical member 166 is supported in the bottom of the lower casing extension 167, upon a suitable disc 168, and is snugly splined to the lower end of the spindle, the member 166 having clearance of say from .015" to .025" with the wall of the extension 167. The driving spline with the plug 164 has a lash of say .030" which exceeds the clearance between the member 166 and the casing wall. Limited lateral movement of the lower end of the spindle is thus provided for, the movement being limited to the clearance between the member 166 and the casing extension 167 and being dampened in operation by the oil which normally occupies the bottom of the casing.

The spindle is supported in the upper end of the shaft in a resilient bushing 169, preferably synthetic rubber, this bushing being supported on a ring 171 which seats on a shoulder 172 at the inner end of a counter bore in the upper end of the shaft, and being secured at the top by a snap ring 173. This bushing not only absorbs and dampens vibration but acts in effect as a pivot for angular movements of the spindle in the shaft. While the illustrated embodiments employ anti-friction bearings, it will be understood that plain bearings may be used instead, the device being well adapted to the use of plain bearings because of the automatic continuous lubrication inherent in the use of oil as the motor fluid.

This application is a division of my co-pending application, Serial No. 184,284 filed September 11, 1950, which has now issued as Patent No. 2,663,541, dated December 22, 1953.

Other modes of applying the principle of the invention may be employed, change being made as regards the details described, provided the features stated in the following claim or the equivalent of such be employed.

I, therefore, particularly point out and distinctly claim as my invention:

A spindle driving device comprising in combination: a housing; a hollow shaft in said housing; means for rotatably supporting said shaft in said housing; a spindle arranged substantially concentrically in said shaft, having throughout the major portion of its axial extent an outside diameter which is substantially less than the inside diameter of the shaft and at one end extending from the shaft; means for driving said shaft; a rotatively rigid torque transmitting connection between said shaft and said spindle for positive drive of the latter through the former; resiliently compressed means separate and distinct from said torque transmitting connection inserted between the spindle and shaft where the spindle extends at said one end from the shaft permitting resiliently opposed relative angular displacement of the axes of said shaft and spindle; and means mounted on the other end of said spindle limiting and, when said spindle is running, opposing the radial displacement of such other end of the spindle and consequently also limiting and opposing the aforesaid angular displacement between the axes of said shaft and spindle.

References Cited in the file of this patent

UNITED STATES PATENTS

| | | |
|---|---|---|
| 1,352,588 | Egedi | Sept. 14, 1920 |
| 2,437,954 | Havill | Mar. 16, 1948 |
| 2,441,565 | Corwin | May 18, 1948 |
| 2,571,267 | Ljunggren | Oct. 16, 1951 |

FOREIGN PATENTS

| | | |
|---|---|---|
| 805,626 | France | Aug. 31, 1936 |